US010541778B1

(12) United States Patent
Cizdziel et al.

(10) Patent No.: US 10,541,778 B1
(45) Date of Patent: Jan. 21, 2020

(54) CHANNEL SELECTION FOR DYNAMIC-FREQUENCY-SELECTION CHANNELS USING PUNCTURING

(71) Applicant: Cisco Technology, Inc., San Jose, CA (US)

(72) Inventors: Benjamin Jacob Cizdziel, San Jose, CA (US); Brian Donald Hart, Sunnyvale, CA (US); Pooya Monajemi, Irvine, CA (US); Vishal Satyendra Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/118,667

(22) Filed: Aug. 31, 2018

(51) Int. Cl.
*H04W 72/04* (2009.01)
*H04L 1/00* (2006.01)
*H04L 12/803* (2013.01)
*H04W 16/14* (2009.01)
*H04L 12/851* (2013.01)
*G01S 7/02* (2006.01)

(52) U.S. Cl.
CPC .......... *H04L 1/0013* (2013.01); *H04L 47/125* (2013.01); *H04L 47/2441* (2013.01); *H04W 16/14* (2013.01); *G01S 7/021* (2013.01)

(58) Field of Classification Search
CPC ... H04L 5/0048; H04L 5/0023; H04L 5/0064; H04L 5/0091
See application file for complete search history.

(56) References Cited

U.S. PATENT DOCUMENTS

| 8,081,104 | B2 | 12/2011 | Hansen |
| 9,306,722 | B2 | 4/2016 | Rangarajan et al. |
| 2014/0315506 | A1 | 10/2014 | Rezk et al. |
| 2017/0273083 | A1 | 9/2017 | Chen et al. |

OTHER PUBLICATIONS

Der-Jiunn Deng et al., "IEEE 802.11ax: Highly Efficient WLANs for Intelligent Information Infrastructure", IEEE Communications Magazine, Dec. 2017, pp. 1-8.

*Primary Examiner* — Jamal Javaid
(74) *Attorney, Agent, or Firm* — Patterson + Sheridan, LLP

(57) ABSTRACT

An access point in a wireless network communicates wirelessly with one or more client devices over a channel that includes a plurality of subchannels. Each subchannel corresponds to a distinct frequency chunk with a respective plurality of subcarriers. Radar is detected on a first subchannel. In response, a selection is made between (i) redefining the channel and (ii) puncturing the first subchannel while continuing to use all other subchannels. Puncturing the first subchannel includes muting subcarriers on the first subchannel. Redefining the channel includes removing multiple subchannels from the channel. The selection is based at least in part on one or more factors that provide indications as to whether puncturing would be efficient and/or effective. The access point continues to communicate wirelessly with the one or more client devices in accordance with the selection.

20 Claims, 5 Drawing Sheets

US 10,541,778 B1

CHANNEL SELECTION FOR DYNAMIC-FREQUENCY-SELECTION CHANNELS USING PUNCTURING

TECHNICAL FIELD

The present disclosure generally relates to channel selection, and in particular, to determining when to use puncturing to mute subcarriers on a subchannel with interference.

BACKGROUND

The wireless channel over which an access point communicates with wireless client devices (e.g., using WiFi) may be divided into multiple subchannels. A given subchannel may become temporarily unavailable due to radar interference. Dynamic frequency selection (DFS) allows wireless access points automatically to select subchannels to avoid a subchannel on which radar is detected. Traditionally, to avoid radar interference, the access point may switch to another channel (e.g., a non-DFS channel) or may reduce the channel bandwidth such that only a primary subchannel is used.

Separately, the proposal for the IEEE 802.11ax WiFi standard (draft chapter 28) specifies the use of puncturing, such that subcarriers in a subchannel may be muted.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
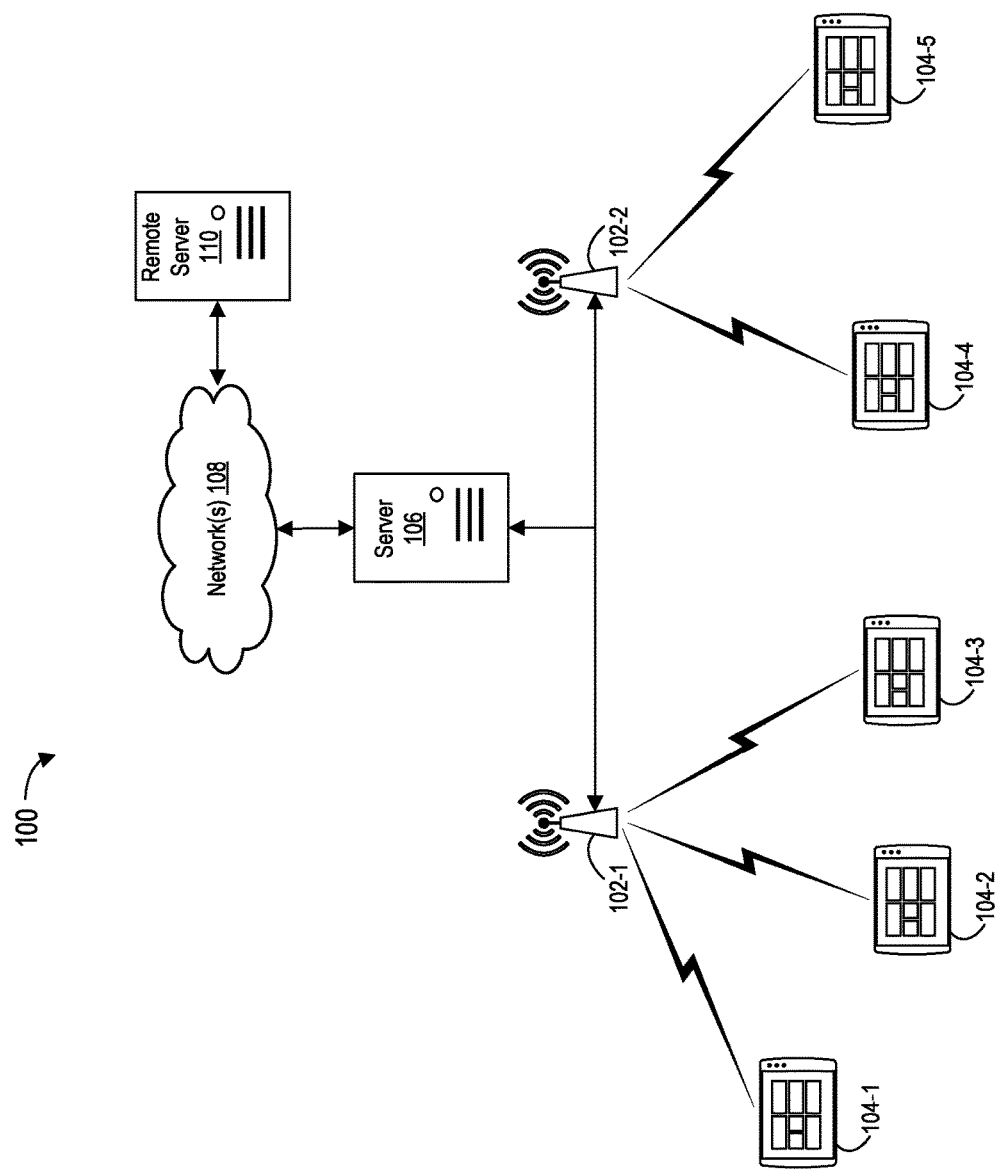
FIG. 1 is a block diagram illustrating a network architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Puncturing, for example as specified in the IEEE 802.11ax proposal, is a tool that could be used in response to detection of radar on a subchannel used by a wireless access point. Techniques are needed, however, to ensure that puncturing is performed efficiently and is not performed when other techniques, such as traditional techniques, would be more efficient. In some implementations, a channel-selection method that addresses this challenge is performed by a first wireless access point. In the method, the first access point communicates wirelessly with one or more client devices over a channel that comprises a plurality of subchannels. Each subchannel of the plurality of subchannels corresponds to a distinct frequency chunk with a respective plurality of subcarriers. The first access point detects radar on a first subchannel of the plurality of subchannels. In response to detecting the radar on the first subchannel, the first access point makes a selection between (i) redefining the channel, which includes removing multiple subchannels including the first subchannel from the channel, and (ii) puncturing the first subchannel while continuing to use all other subchannels in the channel besides the first subchannel. Puncturing the first subchannel includes muting subcarriers on the first subchannel. The selection is based at least in part on one or more factors selected from the group consisting of (i) a number of the one or more client devices that support the puncturing, (ii) one or more traffic characteristics for the first access point, (iii) a spectrum wastage factor indicating an amount of the channel unavailable to any of the one or more client devices that do not support puncturing if puncturing is performed, (iv) radio-frequency density associated with one or more access points adjacent to the first access point, and (v) an expected percentage of transmission time over the channel spent on transmissions that utilize all of the channel except for the punctured first subchannel if the puncturing is performed. The first access point continues to communicate wirelessly with the one or more client devices in accordance with the selection.

FIG. 1 is a block diagram illustrating a network architecture 100 in accordance with some implementations. A plurality of access points 102-1 and 102-2 communicate wirelessly with client devices 104-1 through 104-5 over a wireless channel (e.g., using one or more WiFi protocols). In the example of FIG. 1, client devices 104-1, 104-2, and 104-3 have formed wireless connections with a first access point 102-1, with which they communicate, while client devices 104-4 and 104-5 have formed wireless connections with a second access point 102-2, with which they communicate. Examples of the client devices 104 (which may also be referred to as stations or user devices) include mobile electronic devices (e.g., mobile phones), wearable computing devices, laptop computers, tablet computers, desktop computers, and/or other electronic devices.

The access points 102 may be communicatively coupled to an upstream server 106, through which the access points may access one or more networks 108 and thus one or more remote servers 110. The one or more networks 108 may include any network or combination of networks, such as the Internet, other wide area networks (WAN), local area networks (LAN), metropolitan area networks (MAN), peer-to-peer networks, and/or ad-hoc connections. The access points 102 thereby provide network access (e.g., Internet access) to the client devices 104-1 through 104-5.

The wireless channel over which an access point 102 communicates with (e.g., transmits packets to) respective client devices 104 is divided into a plurality of subchannels. Each subchannel corresponds to a distinct frequency chunk that supports a respective plurality of subcarriers. The subcarriers are used for orthogonal frequency-division multiplexing (OFDM), in accordance with some implementations. In some implementations, each frequency chunk is a 20 MHz frequency chunk (i.e., has a bandwidth of 20 MHz).

Figure 2A:
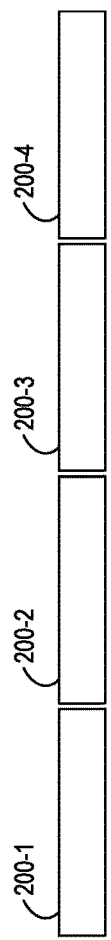
FIGS. 2A-2E show a channel that includes four subchannels in accordance with some implementations.

FIG. 2A shows an example of a channel that includes four subchannels 200-1 through 200-4. In some implementations, the first subchannel 200-1 is a primary subchannel and the other subchannels 200-2 through 200-4 are secondary subchannels. In some implementations, the first two subchannels 200-1 and 200-2 compose a set of primary subchannels and the second two subchannels 200-3 and 200-4 compose a set of secondary subchannels. Within the set of primary subchannels, the first subchannel 200-1 may be considered the primary sub-channel of the set and the second subchannel 200-2 may be considered the secondary sub-channel of the set. In some implementations, each of the subchannels 200-1 through 200-4 corresponds to a distinct 20 MHz frequency chunk or frequency chunk of another bandwidth.

Figure 2B:
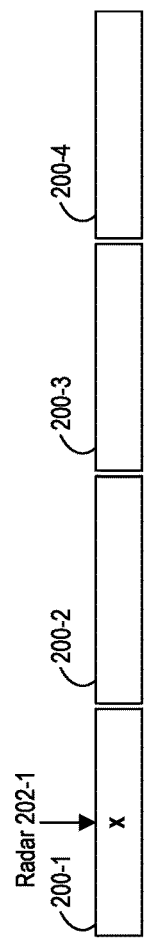
Figure 2C:
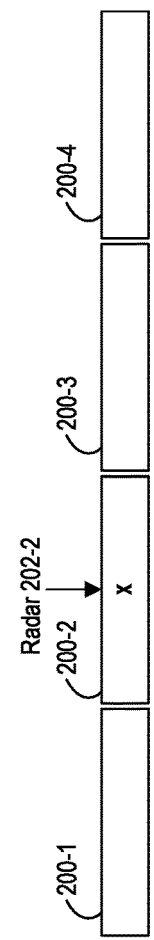
Figure 2D:
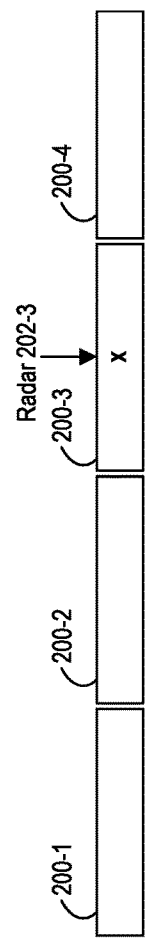
Figure 2E:
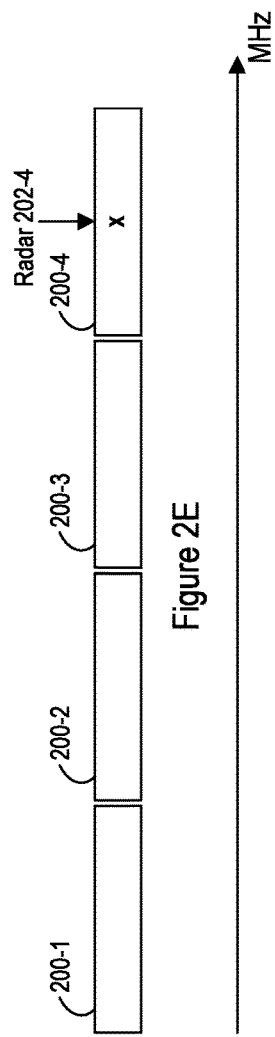

One of the subchannels 200-1 through 200-4 may become temporarily unavailable due to the presence of radar (e.g., a radar pulse) on the subchannel. In FIG. 2B, radar 202-1 is detected on the first subchannel 200-1. In FIG. 2C, radar 202-2 is detected on the second subchannel 200-2. In FIG. 2D, radar 202-3 is detected on the third subchannel 200-3. In FIG. 2E, radar 202-4 is detected on the fourth subchannel 200-4. The access point 102 may respond by puncturing the subchannel 200 on which radar is detected (e.g., subchannel 200-1, FIG. 2B; subchannel 200-2, FIG. 2C; subchannel 200-3, FIG. 2D; subchannel 200-4, FIG. 2E), such that subcarriers on the subchannel 200 are muted and therefore are not used for communication. However, puncturing may not always be the most efficient response to the presence of radar on a subchannel Puncturing allows the access point to use all of the remaining subchannels 200, as opposed to only a portion (e.g., as opposed to only the primary subchannel 200-1, assuming radar was detected on a secondary subchannel 200-2, 200-3, or 200-4). But use of those subchannels by the access point 102-1 effectively denies the adjacent access point 102-2 the ability to use any of those same subchannels without interference from access point 102-1. Also, some or all of the client devices 104 may not support puncturing. The methods 300 and 400, described below, allow an access point 102 to make an intelligent decision regarding whether to puncture and thus to use puncturing efficiently and effectively.

Figure 3:
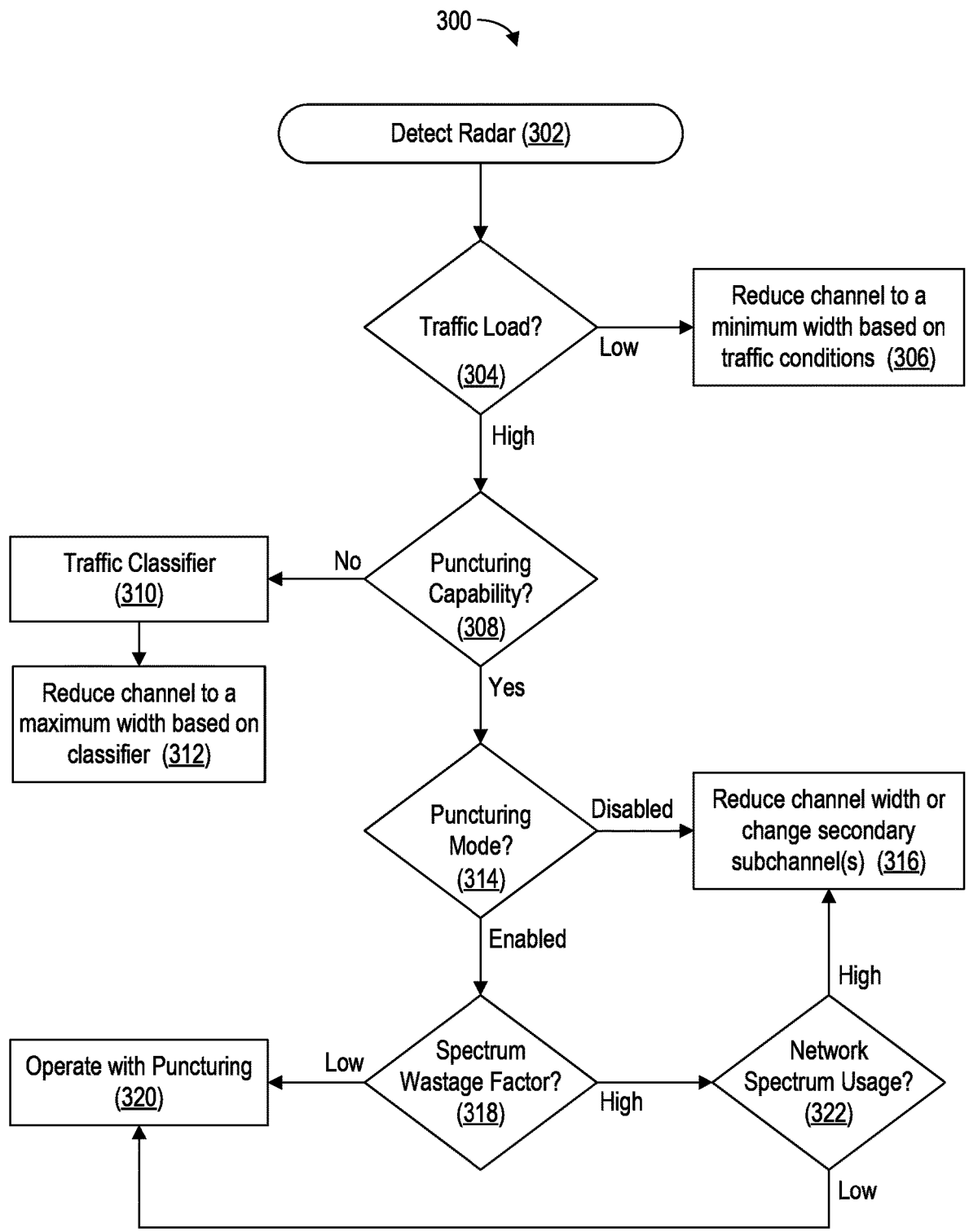
FIGS. 3 and 4 are flowcharts illustrating methods for channel selection in accordance with some implementations.

FIG. 3 shows a flowchart illustrating a channel-selection method 300 in accordance with some implementations. The method 300 is performed by an access point 102 (e.g., access point 102-1 or 102-2, FIG. 1). Steps in the method 300 may be combined or broken out and the sequence of the method 300 may be modified.

In the method 300, the access point 102 detects (302) radar on a subchannel (e.g., subchannel 200-1, FIG. 2B; subchannel 200-2, FIG. 2C; subchannel 200-3, FIG. 2D; subchannel 200-4, FIG. 2E). The access point 102 determines (304) whether the traffic load (e.g., between the access point 102 and the one or more client devices 104) is low or high. For example, the access point 102 determines whether the traffic load satisfies (e.g., exceeds, or equals or exceeds) a minimum threshold. If it does, the traffic load is considered to be high; otherwise, the traffic load is considered to be low. If the traffic load is low, the access point 102 reduces (306) the width of the channel to a minimum width. For example, the access point 102 reduces the width of the channel such that only the subchannel 200-1 (FIG. 2A) is used (assuming radar was not detected on the subchannel 200-1). If the radar is detected on a primary subchannel, the access point 102 switches to a different primary subchannel.

If the traffic load is high but the access point 102 does not have puncturing capability (308—No), then a traffic classifier 310 (e.g., in the access point 102) performs traffic classification and the access point 102 reduces (312) the channel to a maximum width allowed by the traffic classification (e.g., by analogy to step 306).

If the traffic load is high and the access point 102 has puncturing capability (308—Yes), but puncturing mode is disabled (314—Disabled), then the channel width is reduced (316), by analogy to steps 306 and/or 312. Alternatively, if the radar was detected on a secondary subchannel, the secondary subchannels are changed (316). For example, the subchannels 200-3 and 200-4 (FIG. 2A) may compose a set of secondary subchannels. If the radar was detected on either of these subchannels, then the access point 102 may stop using both subchannels 200-3 and 200-4, and instead uses two other subchannels (e.g., not shown in FIGS. 2A-2E). Some embodiments that make use of this secondary subchannel change correspond to the 80+80 MHz channel bandwidth defined in the IEEE 802.11 WiFi standard, in which subchannels 200-1 through 200-4 each correspond to a distinct 40 MHz frequency chunk, with subchannel 200-1 being frequency adjacent to subchannel 200-2 and subchannel 200-3 being frequency adjacent to subchannel 200-4.

If the traffic load is high, access point 102 has puncturing capability (308—Yes), and puncturing mode is enabled (314—Enabled), then a spectrum wastage factor is determined (318). The spectrum wastage factor indicates the size of the portion of the channel (i.e., the amount of the channel) that will only be available to client devices 104 that support puncturing (with respect to the access point 102 that performs the method 300) if the access point 102 were to operate with puncturing on the current channel, and thus are wasted from the perspective of client devices 104 that do not support puncturing. The spectrum wastage factor does not count the portion of the channel that is not available because of radar interference (e.g., does not count the subchannel on which radar is detected). For example, if subchannel 200-1 is the primary subchannel and radar 202-2 is detected on subchannel 200-2 (FIG. 2C), the spectrum wastage factor is 2: two subchannels (i.e., subchannels 200-3 and 200-4) would only be available for use by client devices 104 that support puncturing. Client devices 104 that do not support puncturing would only have primary subchannel 200-1 available for use.

A determination is made (318) as to whether the spectrum wastage factor is low or high. For example, the access point 102 determines whether the spectrum wastage factor satisfies (e.g., exceeds, or equals or exceeds) a minimum threshold. If it does, the spectrum wastage factor is considered to be high; otherwise, the spectrum wastage factor is considered to be low. If the spectrum wastage factor is low, the access point 102 operates with puncturing (320): subcarriers on the subchannel on which radar was detected are muted.

If the spectrum wastage factor is high, however, then a determination of network spectrum usage is made (322). Network spectrum usage indicates the ratio of frequencies that are in use by the reference access point 102 (i.e., the access point 102 performing the method 300) or its neighboring access points to those that are available but not in use. For example, the access point 102 determines whether the network spectrum usage satisfies (e.g., exceeds, or equals or exceeds) a minimum threshold. If it does, the network spectrum usage is considered to be high; otherwise, the network spectrum usage is considered to be low. If the network spectrum usage is low, then the access point 102 operates with puncturing (320). If the network spectrum usage is high, then the channel width is reduced or the secondary subchannels are changed (316). A reason for this distinction is that networks with high network spectrum usage may benefit from access points 102 avoiding puncturing operation, because keeping subchannels free instead of using them for puncturing can allow their use by other access points 102 not operating with puncturing (as unused subchannels are scarce in this case), making the subchannels available for all client devices 104 instead of only client devices 104 that support puncturing.

The method 300 thus considers various factors to determine whether puncturing would be efficient. The method 300 uses binary branching logic, with respective factors being considered in turn (e.g., being compared to respective thresholds in turn). Alternatively, or in addition, however, factors may be considered collectively, with each factor biasing the overall decision toward or away from puncturing. For example, a multi-factor utility function may be evaluated to determine whether to operate with puncturing.

Figure 4:
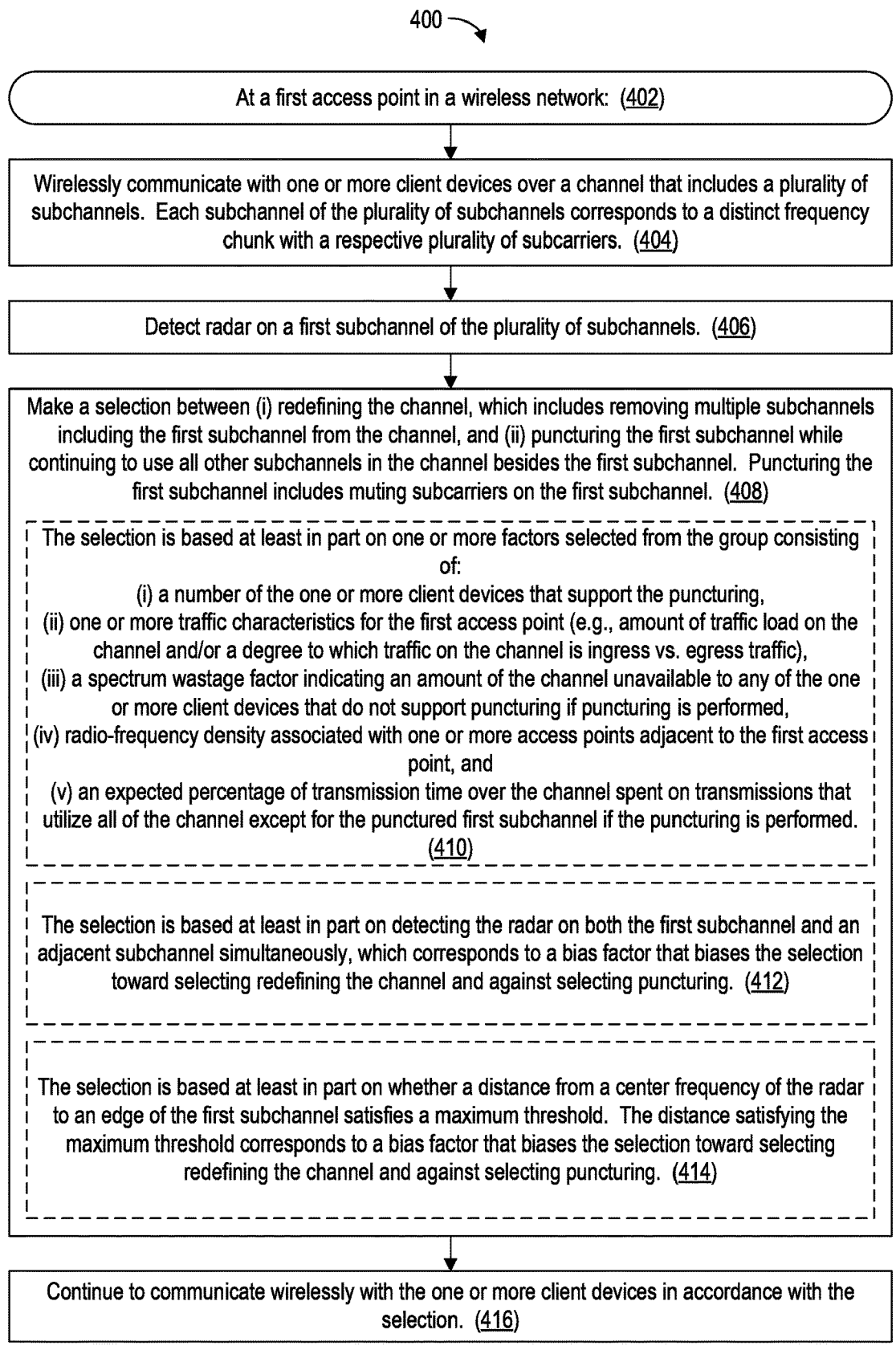

FIG. 4 shows a flowchart illustrating a channel-selection method 400 in accordance with some implementations. The factors considered in the method 400 may each correspond to a bias for or against puncturing. For some factors, the magnitude of the bias may vary based on the value of the factor.

The method 400 is performed (402) by a first access point 102 (e.g., access point 102-1, FIG. 1). The access point 102 wirelessly communicates (404) with one or more client devices 104 (FIG. 1) over a channel that includes a plurality of subchannels (e.g., subchannels 200-1 through 200-4, FIG. 2A). Each subchannel of the plurality of subchannels corresponds to a distinct frequency chunk with a respective plurality of subcarriers. The wireless communication may include wirelessly transmitting packets to the one or more client devices 104 over the channel.

Radar is detected (406) on a first subchannel (e.g., subchannel 200-1, FIG. 2B; subchannel 200-2, FIG. 2C; subchannel 200-3, FIG. 2D; subchannel 200-4, FIG. 2E) of the plurality of subchannels.

A selection is made (408) between (i) redefining the channel, which includes removing multiple subchannels including the first subchannel from the channel, and (ii) puncturing the first subchannel while continuing to use all other subchannels in the channel besides the first subchannel Puncturing the first subchannel includes muting subcarriers on the first subchannel Muting subcarriers on the first channel may include muting all of the subcarriers on the first subchannel or muting only a portion of the subcarriers on the first subchannel (e.g., the portion subject to radar interference, or the portion subject to radar interference plus a buffer). Redefining the channel may include reducing the channel bandwidth, since the access point 102 ceases to use the removed subchannels; continuing to use one or more remaining subchannels in the channel besides the removed subchannels; and/or replacing existing subchannels with other subchannels that the access point 102 was not previously using.

In some implementations, the selection is based (410) at least in part on one or more factors selected from the group consisting of: (i) a number of the one or more client devices 104 that support the puncturing, (ii) one or more traffic characteristics for the first access point 102, (iii) a spectrum wastage factor indicating an amount of the channel unavailable to any of the one or more client devices that do not support puncturing if puncturing is performed (i.e., as described for step 318 of the method 300, FIG. 3), (iv) radio-frequency density associated with one or more access points adjacent to the first access point (e.g., with access point 102-2, where the first access point is the access point 102-1, FIG. 1), and (v) an expected percentage of transmission time over the channel spent on transmissions that utilize the wider channel enabled by the puncturing (i.e., all of the channel except for the punctured first subchannel) if the puncturing is performed.

Some of the client devices 104 may be legacy devices that do not support puncturing. Thus, in some implementations, the selection is based at least in part on the number of the one or more client devices 104 that support the puncturing, and that number may correspond to a bias factor that biases the selection toward selecting puncturing as the number increases and toward selecting redefining the channel as the number decreases. An increase in that number thus would increase the likelihood that the puncturing is selected, and a decrease in that number thus would decrease the likelihood that puncturing is selected (i.e., would increase the likelihood that redefining the channel is selected). This bias factor (or any other bias factor) is not necessarily definitive, however, because other bias factors may be considered.

Alternatively, or in addition, making the selection includes determining whether the number of the one or more client devices 104 that support the puncturing satisfies (e.g., exceeds, or equals or exceeds) a minimum threshold. If the number does not satisfy the minimum threshold, then redefining the channel is selected and puncturing is not selected. If the number satisfies the minimum threshold, however, the selection may still depend in part on other factors. Unless the number is the only factor, the number satisfying the minimum threshold does not guarantee that puncturing is selected, in accordance with some implementations.

In some implementations, the selection is based at least in part on what percentage of the one or more client devices 104 support the puncturing (i.e., on a percentage of the one or more client devices that support the puncturing). The selection is by definition therefore also based in part on the number of the one or more client devices 104 that support the puncturing, because that number is used to determine the percentage. The percentage may correspond to a bias factor that biases the selection toward selecting puncturing as the percentage increases and toward selecting redefining the channel as the percentage decreases. An increase in the percentage thus would increase the likelihood that the puncturing is selected, and a decrease in the percentage would decrease the likelihood that puncturing is selected. Alternatively, or in addition, making the selection includes determining whether the percentage satisfies (e.g., exceeds, or equals or exceeds) a minimum threshold. If the percentage does not satisfy the minimum threshold, then redefining the channel is selected and puncturing is not selected. If the percentage satisfies the minimum threshold, however, the selection may still depend in part on other factors. Unless the percentage is the only factor, the percentage satisfying the minimum threshold does not guarantee that puncturing is selected, in accordance with some implementations.

In some implementations, the selection is based at least in part on the one or more traffic characteristics, which may include an amount of traffic load on the channel to and/or from the access point 102 and/or a degree to which traffic over the channel is ingress traffic (i.e., downstream traffic from the access point 102 to the one or more client devices 104) as opposed to egress traffic (i.e., upstream traffic from the one or more client devices 104 to the access point 102). The amount of traffic load from the one or more client devices 104 to the access point 102 and/or from the access point 102 to the one or more client devices 104 may correspond to a bias factor that biases the selection toward selecting puncturing as the amount of traffic load increases and toward selecting redefining the channel as the amount of traffic load decreases. An increase in the amount of traffic load thus would increase the likelihood that the puncturing is selected, and a decrease in the amount of traffic load would decrease the likelihood that puncturing is selected. An access point 102 with a low traffic load may not benefit from puncturing because it may not yield any performance (e.g., throughput) improvement from the higher bandwidth utilization that puncturing provides over redefining the channel. Conversely, an access point 102 with a high traffic load may benefit from puncturing because the higher bandwidth utilization that puncturing provides may yield a performance (e.g., throughput) improvement.

The degree to which traffic over the channel is ingress (i.e., downstream) traffic as opposed to egress (i.e., upstream) traffic may correspond to a bias factor that biases the selection toward selecting puncturing as the degree increases and toward selecting redefining the channel as the degree decreases. An increase in the degree thus would increase the likelihood that the puncturing is selected, and a decrease in the degree would decrease the likelihood that puncturing is selected. But that bias may not be definitive, because of other bias factors. The access point 102 and client devices 104 will benefit more from puncturing if more transmission time is spent utilizing the entire channel that puncturing makes available as opposed to transmission time spent utilizing only the smaller subset of the channel that is available for non-puncturing client devices 104 to use for standard (i.e., non-orthogonal frequency-division multiple access) transmission or reception. The portion of egress traffic that uses standard transmission from non-puncturing client devices 104 may more commonly be higher than the portion of ingress traffic that uses standard transmission to non-puncturing client devices 104 in the cases that client devices 104 opt out of or do not support uplink orthogonal frequency-division multiple access transmission. The inverse of this bias factor may also be useful in certain situations, in the event that more transmission time is spent utilizing the entire punctured channel for egress traffic as opposed to ingress traffic.

Alternatively, or in addition, making the selection includes determining whether the degree satisfies (e.g., exceeds, or equals or exceeds) a minimum threshold. If the degree does not satisfy the minimum threshold, then redefining the channel is selected and puncturing is not selected. If the degree satisfies the minimum threshold, however, the selection may still depend in part on other factors. Unless the degree is the only factor, the degree satisfying the minimum threshold does not guarantee that puncturing is selected, in accordance with some implementations.

In some implementations, the selection is based at least in part on the spectrum wastage factor. The spectrum wastage factor is a bias factor that biases the selection toward selecting puncturing as the spectrum wastage factor decreases and toward selecting redefining the channel as the spectrum wastage factor increases. A decrease in the spectrum wastage factor thus would increase the likelihood that the puncturing is selected, and an increase in the spectrum wastage factor would decrease the likelihood that puncturing is selected. This bias factor reflects a bias toward puncturing if the bandwidth wastage that puncturing would cause (from the perspective of client devices that do not support puncturing) is small. Alternatively, or in addition, making the selection includes determining whether the spectrum wastage factor satisfies (e.g., is less than, or less than or equal to) a maximum threshold. If the spectrum wastage factor does not satisfy the maximum threshold, then redefining the channel is selected and puncturing is not selected. If the spectrum wastage factor satisfies the maximum threshold, however, the selection may still depend in part on other factors. Unless the spectrum wastage factor is the only factor, the spectrum wastage factor satisfying the maximum threshold does not guarantee that puncturing is selected, in accordance with some implementations.

In some implementations, the selection is based at least in part on the radio-frequency density associated with one or more access points 102 adjacent to the first access point 102. This radio-frequency density corresponds to a bias factor that biases the selection toward selecting redefining the channel as the radio-frequency density increases and toward selecting puncturing as the radio-frequency density decreases. A decrease in the radio-frequency density thus would increase the likelihood that the puncturing is selected, and an increase in the radio-frequency density would decrease the likelihood that puncturing is selected. This bias factor also reflects the importance of channel conservation in a network environment with multiple adjacent access points 102. It may not be efficient for the first access point 102 (e.g., access point 102-1) to use many subchannels when an adjacent access point 102 (e.g., access point 102-2) could make use of the subchannels, since high radio-frequency density is an indicator of high network traffic. In some implementations, another indicator of high network traffic on an adjacent access point 102 may be used as a bias factor for the selection, in an analogous manner.

In some implementations, the selection is based at least in part on the expected percentage of transmission time over the channel spent on transmissions that utilize the wider channel enabled by the puncturing (i.e., all of the channel except for the punctured first subchannel) if puncturing is performed. The percentage may correspond to a bias factor that biases the selection toward selecting puncturing as the percentage increases and toward selecting redefining the channel as the percentage decreases. An increase in the percentage thus would increase the likelihood that puncturing is selected, and a decrease in the percentage would decrease the likelihood that puncturing is selected. Alternatively, or in addition, making the selection includes determining whether the percentage satisfies (e.g., exceeds, or equals or exceeds) a minimum threshold. If the percentage does not satisfy the minimum threshold, then redefining the channel is selected and puncturing is not selected. If the percentage satisfies the minimum threshold, however, the selection may still depend in part on other factors. Unless the percentage is the only factor, the percentage satisfying the minimum threshold does not guarantee that puncturing is selected, in accordance with some implementations. The percentage being higher would yield more performance (e.g., throughput) benefits for the access point 102 and client devices 104 if puncturing is performed, assuming the percentage is reasonably accurate. The percentage may be estimated by taking into account capabilities (e.g., puncturing support) of the access point 102 and client devices 104, configurations (e.g., enablement of orthogonal frequency-division multiple access) of the access point 102 and client devices 104, and/or traffic characteristics that may include the amount of scheduled (e.g., trigger-based) traffic, the amount of non-scheduled (e.g., contention-based) traffic, the amount of traffic load on the channel, and/or the degree to which traffic over the channel is ingress (i.e., downstream) traffic as opposed to egress (i.e., upstream) traffic. Other factors may also be used to estimate the percentage.

In some implementations, the method 400 further includes detecting the radar on both the first subchannel and an adjacent subchannel simultaneously. The selection is based (412) at least in part on detecting the radar on both the first subchannel and the adjacent subchannel simultaneously. The presence of the radar on the two adjacent subchannels corresponds to a bias factor that biases the selection toward selecting redefining the channel and against selecting puncturing. In this scenario, puncturing is less desirable because it cannot allow the use of all subchannels except for one, as it usually does, as it must mute subcarriers on both of the two adjacent subchannels that the radar was detected on.

In some implementations, the method 400 further includes locating a center frequency of the radar and determining whether a distance from the center frequency to an edge of the first subchannel (e.g., an edge adjacent to a second subchannel) satisfies (e.g., is less than, or less than or equal to) a maximum threshold. The selection is based (414) at least in part on whether this distance satisfies the maximum threshold. The distance satisfying the maximum threshold corresponds to a bias factor that biases the selection toward selecting redefining the channel and against selecting puncturing. This bias reflects the idea that if the center frequency is within a specified distance of the edge, then the radar is likely to interfere with communications on an adjacent channel as well.

The access point 102 continues (416) to communicate wirelessly with the one or more client devices in accordance with the selection. For example, the access point 102 continues to wirelessly transmit packets to the one or more client devices 104 over the channel, with the channel being modified in accordance with the selection. If puncturing was selected, the access point 102 continues to communicate using all other subchannels in the channel besides the first subchannel. If redefining the channel was selected, the access point 102 continues to communicate using the one or more remaining subchannels.

In some implementations, redefining the channel includes continuing to use a second subchannel (e.g., subchannel 200-1, FIG. 2A) in the channel while ceasing to use all other subchannels in the channel besides the second subchannel (i.e., removing all other subchannels from the channel).

In some implementations, the first subchannel is in a first set of secondary subchannels (e.g., subchannels 200-3 and 200-4, FIG. 2A). Redefining the channel includes continuing to use a first set of primary subchannels (e.g., subchannels 200-1 and 200-2, FIG. 2A) and ceasing to use (i.e., removing from the channel) the first set of secondary subchannels, and may further include replacing the first set of secondary subchannels with a second set of secondary subchannels that does not overlap with the first set.

In some implementations, the plurality of subchannels includes a primary subchannel (e.g., subchannel 200-1, FIG. 2A) and a plurality of secondary subchannels (e.g., subchannels 200-2, 200-3, and 200-4, FIG. 2A), and the first subchannel is a secondary subchannel. Redefining the channel includes ceasing to use (i.e., removing from the channel) the plurality of secondary subchannels (i.e., all of the secondary subchannels) while continuing to use the primary subchannel.

In some implementations, the first subchannel is a primary subchannel and redefining the channel includes switching to a different primary subchannel.

The method 400 thus allows decisions to be made about when it would be efficient to use puncturing. In some implementations, the decisions are non-binary decisions based on multiple bias factors (e.g., as balanced against each other, with suitable weighting, using a utility function).

Figure 5:
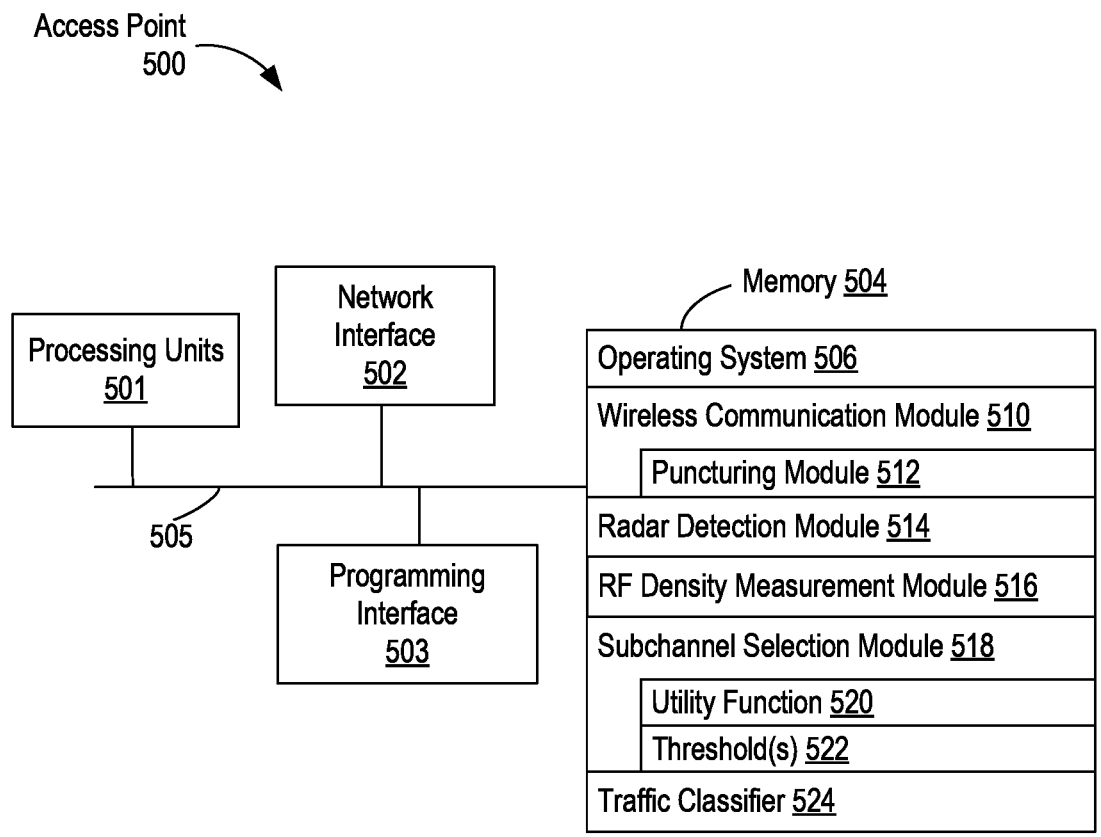
FIG. 5 is a block diagram of an access point in accordance with some implementations.

FIG. 5 is a block diagram of an access point 500 according to some implementations. The access point 500 is an example of an access point 102-1 or 102-2 (FIG. 1) and thus of an access point that performs the methods 300 and/or 400 (FIGS. 3-4). While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the access point 500 includes one or more processing units (e.g., CPUs, network processors, etc.) 501, a network interface 502, a programming interface 503, memory 504, and one or more communication buses 505 for interconnecting these and various other components.

In some implementations, the memory 504 or a non-transitory computer-readable storage medium of the memory 504 stores the following programs, modules, and data structures, or a subset thereof: an optional operating system 506, a wireless communication module 510, a radar detection module 514, a radio-frequency (RF) density measurement module 516, a subchannel selection module 518, and a traffic classier 524. The wireless communication module 510 includes a puncturing module 512 for muting subcarriers on a subchannel. The subchannel selection module 518 may include a utility function 520, which considers various bias factors, and/or one or more thresholds 522. The memory 504 or a non-transitory computer-readable storage medium of the memory 504 thus may include instructions for performing the methods 300 and/or 400 (FIGS. 3-4).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first subchannel could be termed a second subchannel, and, similarly, a second subchannel could be termed a first subchannel, without changing the meaning of the description, so long as all occurrences of the first subchannel are renamed consistently and all occurrences of the second subchannel are renamed consistently. The first subchannel and the second subchannel are both subchannels, but they are not the same subchannel.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A networking method, comprising,
at a first access point in a wireless network, the first access point comprising one or more processors and memory storing instructions for execution by the one or more processors:
 wirelessly communicating with one or more client devices over a channel that comprises a plurality of subchannels, wherein each subchannel of the plurality of subchannels corresponds to a distinct frequency chunk with a respective plurality of subcarriers;
 detecting radar on a first subchannel of the plurality of subchannels;
 in response to detecting the radar on the first subchannel, making a selection between (i) redefining the channel, comprising removing multiple subchannels including the first subchannel from the channel, and (ii) puncturing the first subchannel while continuing to use all other subchannels in the channel besides the first subchannel, wherein:
  puncturing the first subchannel comprises muting subcarriers on the first subchannel, and
  the selection is based at least in part on one or more factors selected from the group consisting of (i) a number of the one or more client devices that support the puncturing, (ii) one or more traffic characteristics for the first access point, (iii) a spectrum wastage factor indicating an amount of the channel unavailable to any of the one or more client devices that do not support puncturing if puncturing is performed, (iv) radio-frequency density associated with one or more access points adjacent to the first access point, and (v) an expected percentage of transmission time over the channel spent on transmissions that utilize all of the channel except for the punctured first subchannel if the puncturing is performed; and
 continuing to communicate wirelessly with the one or more client devices in accordance with the selection.

2. The method of claim 1, wherein:
 wirelessly communicating with one or more client devices comprises transmitting packets from the first access point to the one or more client devices over the channel and receiving packets from the one or more client devices over the channel; and
 continuing to communicate wirelessly with the one or more client devices comprises continuing to transmit packets from the first access point to the one or more client devices in accordance with the selection and continuing to receive packets from the one or more client devices in accordance with the selection.

3. The method of claim 1, wherein puncturing the first subchannel comprises muting all subcarriers on the first subchannel.

4. The method of claim 1, wherein puncturing the first subchannel comprises muting a portion of subcarriers on the first subchannel.

5. The method of claim 1, wherein redefining the channel comprises continuing to use a second subchannel in the channel while ceasing to use all other subchannels in the channel besides the second subchannel.

6. The method of claim 1, wherein:
 the selection is based at least in part on the number of the one or more client devices that support the puncturing; and
 the number of the one or more client devices that support the puncturing corresponds to a bias factor that biases the selection toward selecting puncturing as the number increases and toward selecting redefining the channel as the number decreases.

7. The method of claim 1, wherein:
 the selection is based at least in part on the number of the one or more client devices that support the puncturing; and
 making the selection comprises:
  determining whether the number of the one or more client devices that support the puncturing satisfies a minimum threshold, and
  selecting redefining the channel when the number does not satisfy the minimum threshold.

8. The method of claim 1, wherein:
 the selection is based at least in part on a percentage of the one or more client devices that support the puncturing; and
 the percentage of the one or more client devices that support the puncturing corresponds to a bias factor that biases the selection toward selecting puncturing as the percentage increases and toward selecting redefining the channel as the percentage decreases.

9. The method of claim 1, wherein:
 the selection is based at least in part on a percentage of the one or more client devices that support the puncturing; and
 making the selection comprises:
  determining whether the percentage of the one or more client devices that support the puncturing satisfies a minimum threshold, and
  selecting redefining the channel when the percentage does not satisfy the minimum threshold.

10. The method of claim 1, wherein:
 the selection is based at least in part on the one or more traffic characteristics;
 each of the one or more traffic characteristics is selected from the group consisting of an amount of traffic load on the channel and a degree to which traffic over the channel is ingress traffic as opposed to egress traffic;
 the amount of traffic load on the channel corresponds to a bias factor that biases the selection toward selecting puncturing as the amount increases and toward selecting redefining the channel as the amount decreases; and
 the degree to which traffic over the channel is ingress traffic as opposed to egress traffic corresponds to a bias factor that biases the selection toward selecting puncturing as the degree increases and toward selecting redefining the channel as the degree decreases.

11. The method of claim 1, wherein:
the selection is based at least in part on the expected percentage of transmission time over the channel spent on transmissions that utilize all of the channel except for the punctured first subchannel if the puncturing is performed; and
the expected percentage corresponds to a bias factor that biases the selection toward selecting puncturing as the expected percentage increases and toward selecting redefining the channel as the expected percentage decreases.

12. The method of claim 1, wherein:
the selection is based at least in part on the spectrum wastage factor; and
the spectrum wastage factor is a bias factor that biases the selection toward selecting puncturing as the spectrum wastage factor decreases and toward selecting redefining the channel as the spectrum wastage factor increases.

13. The method of claim 1, wherein:
the selection is based at least in part on the radio-frequency density associated with one or more access points adjacent to the first access point; and
the radio-frequency density associated with one or more access points adjacent to the first access point corresponds to a bias factor that biases the selection toward selecting redefining the channel as the radio-frequency density increases and toward selecting puncturing as the radio-frequency density decreases.

14. The method of claim 1, further comprising, at the first access point, locating a center frequency of the radar and determining whether a distance from the center frequency to an edge of the first subchannel satisfies a maximum threshold,
wherein the distance satisfying the maximum threshold corresponds to a bias factor that biases the selection toward selecting redefining the channel and against selecting puncturing.

15. The method of claim 1, further comprising, at the first access point, detecting the radar on both the first subchannel and an adjacent subchannel simultaneously, wherein:
the selection is based at least in part on detecting the radar on both the first subchannel and an adjacent subchannel simultaneously; and
detecting the radar on both the first subchannel and an adjacent subchannel simultaneously corresponds to a bias factor that biases the selection toward selecting redefining the channel and against selecting puncturing.

16. The method of claim 1, wherein:
the plurality of subchannels comprises a set of primary subchannels and a first set of secondary subchannels;
the first subchannel is in the first set of secondary subchannels; and
redefining the channel comprises:
continuing to use the first set of primary subchannels, ceasing to use the first set of secondary subchannels, and
replacing the first set of secondary subchannels with a second set of secondary subchannels, wherein the second set does not overlap with the first set.

17. The method of claim 1, wherein each distinct frequency chunk is a 20 MHz frequency chunk.

18. The method of claim 1, wherein:
the plurality of subchannels comprises a primary subchannel and a plurality of secondary subchannels;
the first subchannel is a secondary subchannel; and
redefining the channel comprises ceasing to use the plurality of secondary subchannels while continuing to use the primary subchannel.

19. An access point for deployment in a wireless network, comprising:
one or more processors; and
memory storing one or more programs for execution by the one or more processors, the one or more programs including instructions for:
wirelessly communicating with one or more client devices over a channel that comprises a plurality of subchannels, wherein each subchannel of the plurality of subchannels corresponds to a distinct frequency chunk with a respective plurality of subcarriers;
detecting radar on a first subchannel of the plurality of subchannels;
in response to detecting the radar on the first subchannel, making a selection between (i) redefining the channel, comprising removing multiple subchannels including the first subchannel from the channel, and (ii) puncturing the first subchannel while continuing to use all other subchannels in the channel besides the first subchannel, wherein:
puncturing the first subchannel comprises muting subcarriers on the first subchannel, and
the selection is based at least in part on one or more factors selected from the group consisting of (i) a number of the one or more client devices that support the puncturing, (ii) one or more traffic characteristics for the access point, (iii) a spectrum wastage factor indicating an amount of the channel unavailable to any of the one or more client devices that do not support puncturing if puncturing is performed, (iv) radio-frequency density associated with one or more adjacent access points, and (v) an expected percentage of transmission time over the channel spent on transmissions that utilize all of the channel except for the punctured first subchannel if the puncturing is performed; and
continuing to communicate wirelessly with the one or more client devices in accordance with the selection.

20. A non-transitory computer-readable storage medium storing one or more programs configured for execution by a first access point in a wireless network, the one or more programs comprising instructions for:
wirelessly communicating with one or more client devices over a channel that comprises a plurality of subchannels, wherein each subchannel of the plurality of subchannels corresponds to a distinct frequency chunk with a respective plurality of subcarriers;
detecting radar on a first subchannel of the plurality of subchannels;
in response to detecting the radar on the first subchannel, making a selection between (i) redefining the channel, comprising removing multiple subchannels including the first subchannel from the channel, and (ii) puncturing the first subchannel while continuing to use all other subchannels in the channel besides the first subchannel, wherein:
puncturing the first subchannel comprises muting subcarriers on the first subchannel, and the selection is based at least in part on one or more factors selected from the group consisting of (i) a number of the one or more client devices that support the puncturing, (ii) one or more traffic characteristics for the first access point, (iii) a spectrum wastage factor indicating an amount of the channel unavailable to any of the one or more client devices that do not support puncturing if puncturing is performed, (iv) radio-frequency density associated with one or more access points adjacent to the first access point, and (v) an expected percentage of transmission time over the channel spent on transmissions that utilize all of the channel except for the punctured first subchannel if the puncturing is performed; and continuing to communicate wirelessly with the one or more client devices in accordance with the selection.

* * * * *